(12) United States Patent (10) Patent No.: US 12,664,228 B1
Brown et al. (45) Date of Patent: Jun. 23, 2026

(54) AUTONOMOUS GENERATION AND SELF-HEALING OF WEB AUTOMATION SCRIPTS

(71) Applicant: Intuit Inc., Mountain View, CA (US)

(72) Inventors: Kyle Patrick Brown, San Diego, CA (US); Neo Yuchen, Arcadia, CA (US); Shibo Yao, Carlsbad, CA (US); Clifford Green, San Diego, CA (US); Zhanar Seitmagzimova, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/375,608

(22) Filed: Oct. 31, 2025

(51) Int. Cl.
    *G06F 16/958*    (2019.01)
    *G06F 9/451*     (2018.01)
    *G06F 16/28*     (2019.01)
    *G06F 16/36*     (2019.01)
    *G06F 16/951*     (2019.01)
    *G06F 16/9535*    (2019.01)
(52) U.S. Cl.
    CPC ............ *G06F 16/958* (2019.01); *G06F 9/451* (2018.02); *G06F 16/285* (2019.01); *G06F 16/36* (2019.01); *G06F 16/951* (2019.01); *G06F 16/9535* (2019.01); *G06F 16/972* (2019.01); *G06F 16/986* (2019.01)
(58) Field of Classification Search
    CPC .... G06F 16/986; G06F 16/972; G06F 16/951; G06F 16/9535; G06F 16/285; G06F 16/36; G06F 16/958
    USPC .......................................... 707/709; 715/854
    See application file for complete search history.

(56) References Cited

U.S. PATENT DOCUMENTS

| | | | |
|---|---|---|---|
| 9,146,906 B1 * | 9/2015 | Collins | ............... G06F 16/9577 |
| 10,963,372 B1 * | 3/2021 | Jena | ...................... G06F 11/362 |
| 12,242,958 B2 * | 3/2025 | Dutt | ......................... G06N 3/09 |

(Continued)

OTHER PUBLICATIONS

Xie, Xiao-po, "Web Information Obtaining Method, Device, Computer Device AND Storage Medium", Chainese Patent English Translation CN 118364195 A, Date Published Jul. 19, 2024 (Year: 2024).*

(Continued)

*Primary Examiner* — Shahid A Alam
(74) *Attorney, Agent, or Firm* — Lathrop GPM LLP

(57) ABSTRACT

Autonomous generation includes generating, with a large language model (LLM), an action list for performing an extraction task from at least one website. Generating the action list may include for each action in the action list performing operations. The operations include capturing current webpage data including a screenshot of a current webpage and a set of interactable widgets, obtaining, using an LLM processing the current webpage data, a next action attribute set, adding the next action attribute set, and performing the next action. Autonomous generation also includes traversing the action list to filter out at least one superfluous action, generating, after filtering, a set of machine executable instructions from the action list, and storing the set of machine executable instructions associated with a task identifier. Autonomous generation also includes executing the set of machine executable instructions to extract a data element from the at least one website.

20 Claims, 11 Drawing Sheets

(56) References Cited

U.S. PATENT DOCUMENTS

| | | | |
|---|---|---|---|
| 2007/0124701 A1* | 5/2007 | Gong .................... | G06F 16/954 715/777 |
| 2020/0118071 A1* | 4/2020 | Venkatesan ............ | G06N 20/00 |
| 2022/0038348 A1* | 2/2022 | Mayor ................... | G06N 20/00 |

OTHER PUBLICATIONS

Chen, Si-de, "Network Data Self-adaptive Collecting Method and System Based On Pre-training Large Model", Chainese Patent English Translation CN 119884527 A, Date Published Apr. 25, 2025 (Year: 2025).*
Web Page Information Method, Device and Storage Medium (Year: 2024).*
Network Data Self-adaptive Collecting Method And System Based on Pre-training Large Model (Year: 2025).*
OpenAI, "Computer-Using Agent", Jan. 23, 2025, 13 pages.
IBM, What is Robotic Process Automation (RPA), Sep. 21, 2021, 6 pages.

* cited by examiner

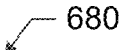

680

```
{
  "cookbook_id": "property_tax",
  "recipe_id": "harris_tx",
  "target_url": "https://www.hctax.net/Property/PropertyTax",
  "task_description": "Extract property tax information for Harris County, TX properties",
  "version": 1,
  "created_at": "2024-01-15T10:30:00Z",
  "last_validated_at": "2024-01-15T10:30:00Z",
  "status": "active",
  "agent_model": "anthropic.claude-3-7-sonnet-20250219-v1-0-vision",
  "storage_path": "s3://intuit-fetch-bucket-prd/property_tax/harris_tx/v1.json"
}

{
  "cookbook_id": "property_tax",
  "recipe_id": "hamilton_in",
  "target_url": "https://secure2.hamiltoncounty.in.gov/PropertyReports/index.aspx
",
  "task_description": "Extract property tax information for Hamilton County, IN properties",
  "version": 2,
  "created_at": "2024-01-21T11:30:00Z",
  "status": "pending_validation",
  "agent_model": "anthropic.claude-3-7-sonnet-20250219-v1-0-vision",
  "storage_path": "s3://intuit-fetch-bucket-prd/property_tax/hamilton_in/v2.json"
}
```

*FIG. 6C*

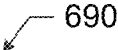

690

```
[
  {
    "action_type": "goto",
    "selector": null,
    "value": null,
    "timeout": 30000,
    "description": "Navigate to https://propertytax.alamedacountyca.gov/search",
    "metadata": { "step": 1, "reasoning": "Navigate to the Alameda County property tax search
page", "url": "https://propertytax.alamedacountyca.gov/search", "force_same_tab": true },
    "argument_placeholder": null, "name": null, "frame_selector": null
  },
  {
    "action_type": "wait",
    "selector": null,
    "value": null,
    "timeout": 1000,
    "description": "Wait for 1000ms",
    "metadata": { "step": 4, "reasoning": "Wait for the page to load completely" },
    "argument_placeholder": null, "name": null, "frame_selector": null
  },
  {
    "action_type": "fill",
    "selector": "#address",
    "value": null,
    "timeout": 30000,
    "description": "Fill 'address.get_full_address()' into element #address",
    "metadata": { "step": 6, "reasoning": "Enter the complete address in the search field" },
    "argument_placeholder": "address.get_full_address()", "name": null, "frame_selector": null
  }
]
```

*FIG. 6D*

900
Computing
System

912
Output Device(s)

904
Non-Persistent
Storage

902
Computer
Processor(s)

906
Persistent
Storage

908
Communication
Interface

910
Input Device(s)

920
Network

922
Node X

924
Node Y

926
Client Device

AUTONOMOUS GENERATION AND SELF-HEALING OF WEB AUTOMATION SCRIPTS

BACKGROUND

To answer end users' questions or perform functionality from an end user, a server application may use data from third parties. In many cases, different third-party sources may provide the same type of data, whereby the third-party source is dependent on attributes of the user. Thus, the server application may have hundreds or thousands of third-party sources from which to gather the particular type of data. Further, each third-party source may have one or more websites through which such data is published. Additionally, obtaining the target data may involve traversing one or more websites to obtain additional intermediate data that is used to identify the target data.

By way of a more specific example, a financial application may use property tax information published by county record offices. Users across one or more countries may use the same financial application to manage their finances that use the property tax information. Thus, the financial application must be able to extract the data from multiple websites of the various national and international county record offices.

To address the challenge of automatically extracting data, the server application may use scripts that perform web scraping. These scripts, written in scripting languages, allow users to programmatically access and collect structured or unstructured data from websites. Web scraping is especially useful when APIs are unavailable or limited, enabling the server application to gather large volumes of data efficiently for insights and decision-making.

However, using scripts for data extraction comes with several challenges and risks. Websites frequently change their structure, which can break the scripts thereby causing errors to users and manual script regeneration. Further, script generation is often a time consuming process.

Outside of scripts, agentic frameworks may use a large language model (LLM) to perform web scraping and obtain data from websites. Such agentic frameworks generally take meandering or nonefficient paths through a website. Thus, the pathway through the agentic framework, if repeated, causes the server application to be inefficient in resource usage.

SUMMARY

In general, in one aspect, one or more embodiments relate to a method that includes generating, with a large language model (LLM), an action list for performing an extraction task from at least one website. Generating the action list may include for each of multiple actions in the action list performing operations. The operations include capturing current webpage data including a screenshot of a current webpage and a set of interactable widgets on the current webpage, and obtaining, using an LLM processing the current webpage data, a next action attribute set for a next action to perform extraction task. The next action is in the multiple actions. The operations also include adding the next action attribute set to the action list and performing the next action according to the next action attribute set. The method also includes traversing the action list to filter out at least one superfluous action, generating, after filtering, a set of machine executable instructions from the action list, and storing the set of machine executable instructions associated with a task identifier of the extraction task. The method also includes executing the set of machine executable instructions to extract a data element from the at least one website.

In general, in one aspect, one or more embodiments relate to a system that includes one or more computer processors, a builder executing on the one or more computer processor and configured for generating, with a large language model (LLM), an action list for performing an extraction task from at least one website. Generating the action list may include for each of multiple actions in the action list performing operations. The operations include capturing current webpage data may include a screenshot of a current webpage and a set of interactable widgets on the current webpage and obtaining, using an LLM processing the current webpage data, a next action attribute set for a next action to perform extraction task. The next action is in the multiple actions. The operations further include adding the next action attribute set to the action list, performing the next action according to the next action attribute set, and generating a set of machine executable instructions from the action list. The system also includes an extraction data storage storing the set of machine executable instructions associated with a task identifier of the extraction task and an orchestrator executing on the one or more computer processors. The orchestrator is configured for receiving a request to perform the extraction task, retrieving the set of machine executable instructions using the task identifier of the extraction task, executing the set of machine executable instructions to extract a data element from the at least one website, and responding to the request with the data element.

In general, in one aspect, one or more embodiments relate to a system that includes periodically testing a set of machine executable instructions to extract a data element from at least one webpage and regenerating the set of machine executable instructions when testing results in failure. Regenerating the set of machine executable instructions may include generating, with a large language model (LLM), a revised action list for performing an extraction task. Generating the revised action list may include capturing current webpage data of a current webpage, prompting the LLM, with the current webpage data and a current next action attribute set of a current next action in an action list, to generate a revised next action attribute set for a revised next action to perform the extraction task, comparing the revised next action attribute set to the current next action attribute set, updating the current next action attribute set in the revised action list when the revised next action deviates from the current next action, and performing the revised next action according to the revised next action attribute set.

Other aspects of one or more embodiments will be apparent from the following description and the appended claims.

BRIEF DESCRIPTION OF DRAWINGS

FIG. 6A, FIG. 6B, FIG. 6C, and FIG. 6D show an example architecture diagram in accordance with one or more embodiments.

Like elements in the various figures are denoted by like reference numerals for consistency.

DETAILED DESCRIPTION

One or more embodiments are directed to a multistage process for generating and maintaining machine executable instructions for extracting a data element from a website. The multistage process includes a first stage, whereby a large language model (LLM) determines a path through a website, and a second stage of correcting the path.

By way of more detail of the first stage, to generate the action list, the LLM iteratively selects next actions to perform on a webpage. To select the next action, a screenshot and a set of interactable widgets (e.g., check boxes, text boxes, and other widgets with which a user of the webpage may interact) are provided to the LLM as part of a prompt. The LLM is prompted to identify the next action to achieve the extraction task. The LLM outputs the next action to the action list. The next action is also performed. The process repeats with the new state of the webpage after the next action is performed. When the LLM identifies the target data, the process stops.

In the second stage, the path is filtered to remove superfluous actions. Then, machine executable instructions are generated from the path after the filtering. The machine executable instructions may be scripting language code or a data structure that is interpretable by a program. When a new request is received for a particular data element, the machine executable instructions are executed to extract the data element.

Figure 1:
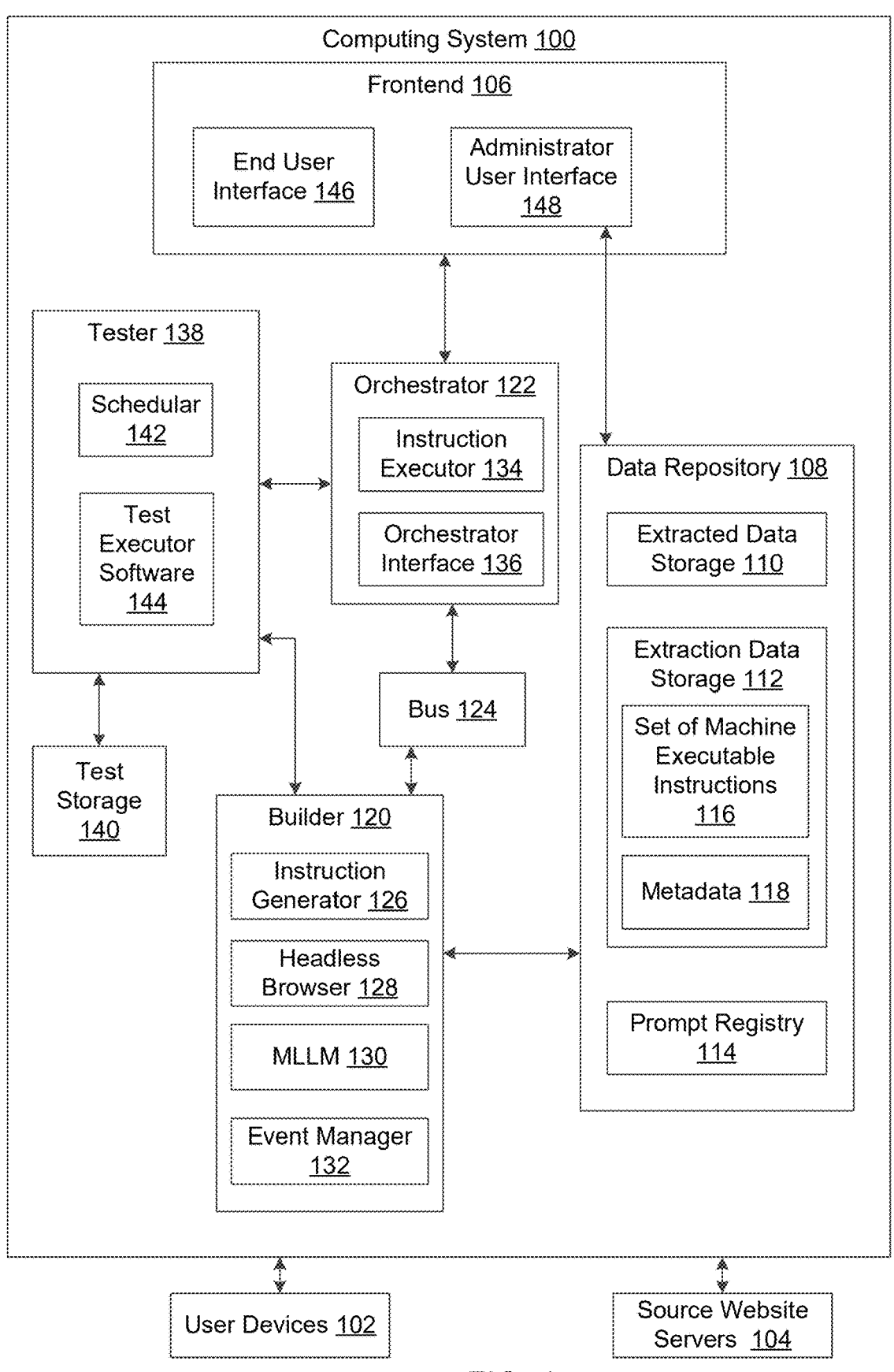
FIG. 1 shows a system including a computing system connected to in accordance with one or more embodiments.

Attention is now turned to the figures. FIG. 1 shows a computing system, in accordance with one or more embodiments. The system shown in FIG. 1 includes a data repository (108). The data repository (108) is a type of storage unit or device (e.g., a file system, database, data structure, or any other storage mechanism) for storing data. The data repository (108) may include multiple different, potentially heterogeneous, storage units and/or devices.

FIG. 1 shows a computing system (100) that is configured to generate and automatically update machine executable instructions that extract data from third-party websites in accordance with one or more embodiments. The computing system (100) may correspond to the computing system shown in FIG. 9A and FIG. 9B. The computing system (100) includes multiple interconnected modules that collectively generate and store machine executable instructions for extracting data elements, manage requests for the data elements, and detect when the machine executable instructions become incapable of extracting data elements. As shown in FIG. 1, the computing system includes a frontend (106) communicatively connected to a data repository (108) and an orchestrator (122). The orchestrator (122) is also communicatively connected to a builder (120) via a bus (124). The builder (120) may also access the data repository (108). The computing system (100) further includes a tester (138) and test storage (140) that are connected to the orchestrator (122) and builder (120).

The computing system (100) is configured to interface with a user device (102) via a communication interface (not shown) in the computing system and a communications network (not shown). The communication interface may include a hardware or software interface (e.g., network interface card, networking stack) that is configured to transmit information over the communications network. The communications network may be the Internet, an internal network, or another network. A user device (102) is a device that may be used by a user, such as an end user or an administrator user. The end user is a user for which a new data element is obtained. The administrator user is a user that may control the computing system (100), such as the various components in the computing system shown in FIG. 1. For example, a user device may be the computing system shown in FIG. 9A and FIG. 9B.

The user devices (102) may interact with the frontend (106) of the computing system to submit extraction requests and retrieve results.

The computing system (100) is also configured to interact with source website servers (104). The source website servers (104) are target servers hosting the data to be extracted. The source website servers host a website that publishes the data. A piece of data to be extracted is referred to herein as a data element. To extract the data element, the source website server may have multiple webpages through which a user may populate data. For example, to obtain a tax statement for a piece of property, a first webpage may receive an address lookup, which causes navigation to a second webpage for obtaining an account identifier. A third webpage may present the data element identifying the amount. In some cases, extracting the data element involves extracting from multiple source websites.

Continuing with FIG. 1, the data repository (108) is a type of storage unit or device (e.g., a file system, database, data structure, or any other storage mechanism) for storing data. The data repository (108) may include multiple different, potentially heterogeneous, storage units and/or devices. The data repository (108) includes an extracted data storage (110), an extraction data storage (112) having machine executable instructions (116) and metadata (118), and a prompt registry (114). The extracted data storage (110) is storage that stores raw and processed data extracted from the source websites on the one or more source website servers. Extracted data storage (110) may store the extracted data associated with a user account. For example, the extracted data storage (110) may be storage of at least one software application that performs various operations on the extracted data.

The extraction data storage (112) stores information that is configured to perform the extraction. Specifically, the extraction data storage (112) stores a set of machine executable instructions (116) and metadata (118). The set of machine executable instructions is a sequence of instructions that when executed, cause a data element to be extracted from one or more source website servers. In one or more embodiments, the set of machine executable instructions is a data file that includes a series of steps. For example, the set of machine executable instructions may be a series of interpretable steps in a JAVASCRIPT® Object Notation (JSON). Each step in the series may be associated with an attribute name and attribute value pairs. The attribute name and attribute value pairs may specify the action to perform on a particular webpage, the interactable widget within which to perform the action, any input to the interactable widget, and any output. For example, the action may be to read, write, or select. The interactable widget may be specified based on a location or a field name. The input and output may be specified by a name for the input or output.

As another example, the set of machine executable instructions may be computer readable program code. For example, the set of machine executable instructions may be a scripting language code, such as JAVASCRIPT© code. In such embodiments, the set of machine executable code is directly executable.

Each set of machine executable code (116) is related to metadata (118). The metadata (118) captures contextual information such as the type of data element extracted by the corresponding set of machine executable code, a name of the source, timestamps, source website locators (e.g., uniform resource locators (URLs)), a third-party name of the third party from which the information is gathered, and schema definitions.

Continuing with the data repository (108), the prompt registry (114) maintains a set of prompts for triggering the LLM (described below) to generate or refine an action list to extract the data element. The prompt to generate an action list may specify, as input, the type of data element, current webpage data of a current webpage, and a current state including the current data, and request, as output, a next action. The prompt to refine the action list may further specify a next action and a request correction or an approval of the next action. An action list is a sequence of actions that when performed, extract a data element from one or more third-party websites. An action list may have superfluous actions as well as useful actions. Superfluous actions are actions that do not change the state or directly or indirectly cause the extraction of the data element. For example, superfluous actions may be a sequence that involves selecting a button to transition to a webpage and then reverting to a prior webpage, without inputting any data or reading any data.

The builder (120) is configured to generate and manage extraction logic. The builder includes an instruction generator (126), a headless browser (128), an LLM (130), and an event manager (132). The instruction generator (126) is configured to generate machine executable instructions (116). For example, the instruction generator (126) may obtain current webpage data, trigger the LLM (130) with a prompt, and add the output to an action list. The instruction generator is further configured to generate the machine executable instructions from the action list.

The headless browser (128) corresponds to the standard definition used in the art. The headless browser (128) is a browser that simulates user interactions with websites without rendering a graphical interface.

The LLM (130) corresponds to the standard definition used in the art. The LLM may be a multimode large language model. The LLM in machine learning refers to a model that significantly exceeds standard machine learning models in terms of scale, complexity, and capacity. Specifically, the LLM is defined by having millions or more parameters (e.g., can be in the hundreds of millions to billions of parameters), which cause the LLM to learn and represent highly complex patterns in data. An LLM therefore uses substantial computational resources for training and inference and are often trained on massive datasets. Specifically, the LLM (130) is generally trained on large quantities of unlabeled text using self-supervised learning or semi-supervised learning. In one or more embodiments, the LLM is a multimodal LLM (MLLM). An MLLM can understand images, natural language, and generate text and other forms of content that are in different modes. Examples of MLLMs include the GPT-5® model and Open AI O3 from OpenAI company, LLAMA® model from Meta, and GEMINI® model from Google. Other LLMs and MLLMs may be used without departing from the scope of the claims.

The event manager (132) monitors the bus (124) for events related to new extraction tasks, tracks, and responds to events. The event manager (132) is connected to the bus (124). The bus (124) is a communication backbone that interconnects the orchestrator (122), builder (120), and data repository (108). The bus (124) is configured to perform asynchronous message passing and handles transactional integrity for various operations.

The orchestrator (122) is a software coordination engine responsible for managing the lifecycle of extraction tasks. The orchestrator includes an instruction executor (134) and an orchestrator interface (136). The instruction executor (134) is configured to obtain a set of machine executable instructions (116) corresponding to a particular request from the extraction data storage (112). In one or more embodiments, the instruction executor (134) includes a headless browser for obtaining a webpage and processing the webpage using the set of machine executable instructions. The orchestrator interface (136) is an application programming interface (API) layer for data extraction.

The tester (138) is software that is configured to validate the correctness and robustness of the set of machine executable instructions. The tester (138) includes a scheduler (142) and test executor software (144) and is connected to test storage (140). The test storage (140) stores test cases. The test case is data for testing a set of machine executable instructions. A test case includes input, a corresponding website, and the correct output. For example, for property taxes, the test case may include an address, a year for determining the amount, and result in the correct property taxes. The scheduler (142) is configured to trigger a test. For example, the scheduler (142) may trigger automated test runs at predefined intervals or after system updates. The test executor software (144) is configured to obtain a test case and trigger processing by the orchestrator. The test executor software (144) is configured to compare the output of the orchestrator (122) to the correct output.

The frontend (106) provides user-facing interfaces for initiating, configuring, and monitoring extraction workflows. The frontend (106) includes an end user interface (146) and an administrator user interface (148). The end user interface (146) may be a graphical user interface (GUI) or web-based dashboard that allows end users to submit extraction requests, view progress, and download extracted data. The end user interface (146) may be an interface of a separate software application or an interface of the extraction software. The administrator user interface (148) is a control panel for administrators to request extraction, manage system resources, and configure scheduling policies.

While FIG. 1 shows a configuration of components, other configurations may be used without departing from the scope of one or more embodiments. For example, various components may be combined to create a single component. As another example, the functionality performed by a single component may be performed by two or more components.

FIG. 2, FIG. 3, FIG. 4, and FIG. 5 show flowcharts in accordance with one or more embodiments. The method of FIG. 2, FIG. 3, FIG. 4, and FIG. 5 may be implemented using the system of FIG. 1 and one or more of the steps may be performed on or received at one or more computer processors. While the various steps in these flowcharts are presented and described sequentially, at least some of the steps may be executed in different orders, may be combined or omitted, and at least some of the steps may be executed in parallel. Furthermore, the steps may be performed actively or passively.

Figures 2, 3:
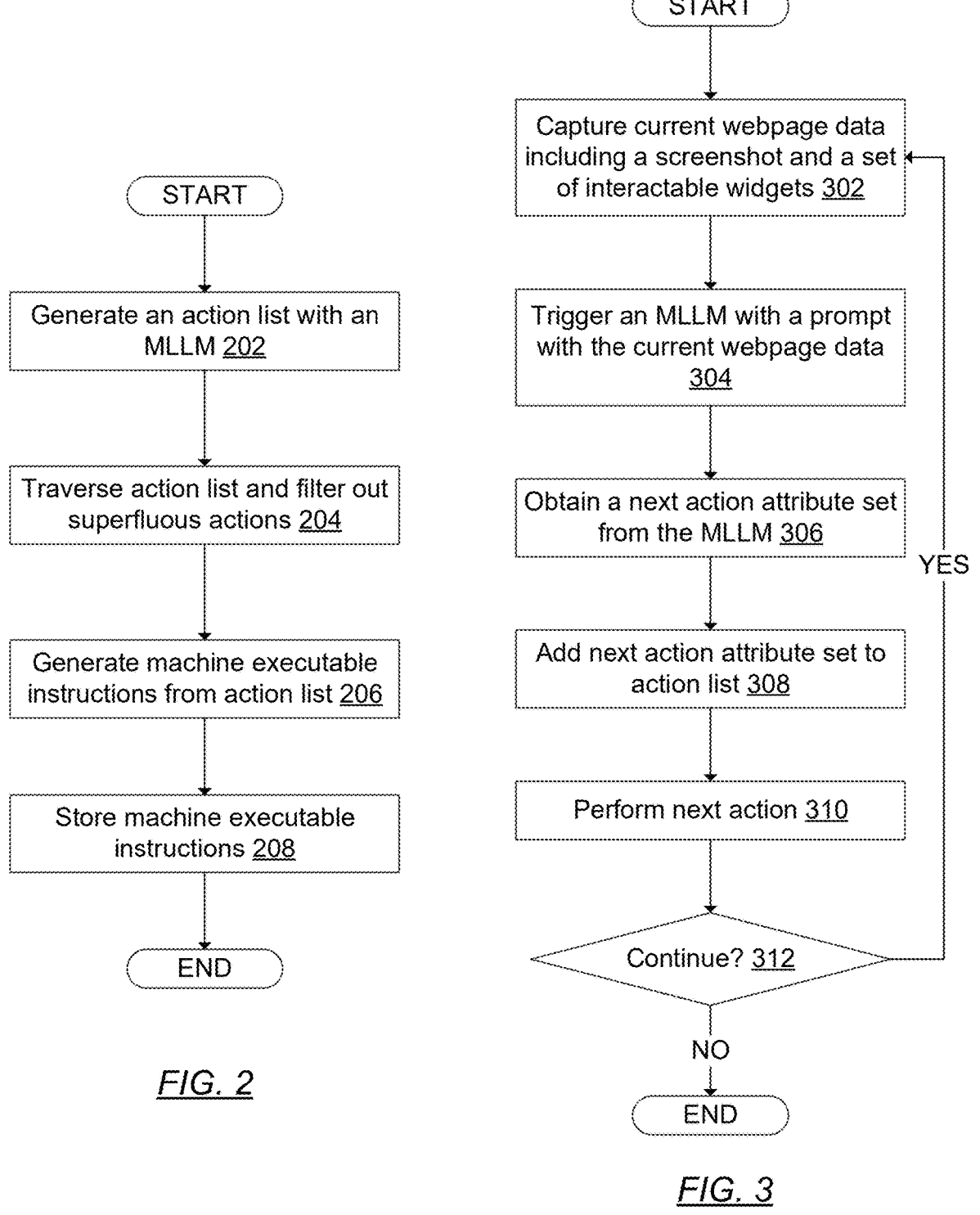
FIG. 2 shows a flowchart of a method for generating machine executable instructions in accordance with one or more embodiments.
FIG. 3 shows a flowchart of a method for generating an action list in accordance with one or more embodiments.

FIG. 2 shows a flowchart illustrating a method for generating machine executable instructions from an action list in accordance with one or more embodiments. Each block is described below.

Block 202 includes generating an action list with an LLM. Generating the action list is part of task intake and queue. The orchestrator interface receives a task request. The task request may include target website location and a natural language description of the desired automation (e.g., "Log in and extract the account balance"). The instruction executor within the orchestrator validates the request, assigns a unique task identifier, and publishes the task details to the bus. The event manager in the builder the task from an input queue populated by the bus. The event manager may instantiate the instruction generator instance. The instruction generator may be an AI agent. The instruction generator uses an LLM and a headless browser to understand the task and obtain the actions.

Block 204 includes traversing the action list and filtering out superfluous actions. While traversing the action list, a sequence of states from performing the actions is determined. Each state includes the current webpage, any property that has a value change (e.g., populated by performing an action), and any property that is used as input to the page, and whether an interactable widget is selected based on a property. A property is a data value that is used as input or obtained as output from a source website. For example, when a property is used as input, the state value for the property may be marked as used as input.

Filtering out at least one superfluous action includes determining a subsequence of the sequence of states between actions that are unchanged. Each state in the sequence of states corresponds to the result of performing a corresponding action. A subsequence is identified in which the states do not change. For example, moving from one tab on a website to another tab and then back to the first tab means that the accumulation of states do not change. Thus, the corresponding actions are superfluous and are removed.

Block 204 may be performed by iterating through the generated action list and applying filtering logic to remove redundant or unnecessary steps. For instance, if the action list contains duplicate navigation commands or irrelevant actions (e.g., "refresh page" when not required), the superfluous actions are eliminated. Filtering may use rule-based heuristics or semantic similarity checks to ensure only actions that change the internal state remain.

Block 206 includes generating machine executable instructions from the action list. Generating the machine executable instructions may include converting the refined action list into low-level, machine executable instructions. For example, the system may translate "click on product category" in a browser automation command such as a headless browser instruction. The conversion process may include mapping actions to predefined templates and inserting dynamic parameters, such as URLs or a cascading style sheet (CSS) selector.

More specifically, the logged actions and selectors in the action list after filtering are translated into an executable web automation script or other set of machine executable instructions. The generated script includes logic to perform the browser actions and extract the target content.

Block 208 includes storing the machine executable instructions. The machine executable instructions are stored in the extraction data storage with metadata. The metadata may include the natural language description or the extraction task from Block 202. The metadata may also include a timestamp associated with generating the machine executable instructions.

In some cases, the instruction executor dynamically runs the newly generated machine executable instructions in an isolated, clean browser environment to validate the instructions' basic functionality and ensure the intended content is extracted without errors.

If validation is successful, a storage interface saves the machine executable instructions to a persistent file storage (e.g., local filesystem or cloud storage like S3). The storage interface may also save associated metadata. The metadata may include the original task, set of machine executable instructions identifier, version, status "active," selectors used, and the script's storage path) to the data repository. The successful completion may be acknowledged on the bus. If validation fails, the metadata may be saved with a failed status.

FIG. 3 shows a flowchart for performing Block 202 in accordance with one or more embodiments. Specifically, FIG. 3 shows a flowchart for generating an action list. FIG. 3 expands the operations of Block 202 of FIG. 2. As shown in FIG. 3, Block 302 includes capturing current webpage data including a screenshot and a set of interactable widgets. Block 302 may be performed by using a headless browser or a similar automation tool to render the current webpage and capture the webpage state. The captured data may include a full-page screenshot and a structured representation of interactable elements, such as buttons, input fields, and links. For example, the instruction generator may extract the document object model (DOM) tree and identify elements with associated CSS selectors or path expressions.

Block 304 includes triggering an LLM with a prompt from the current webpage data. Triggering the LLM may be performed by constructing a prompt that includes the captured webpage data from a prompt template. The prompt requests that the LLM use the input to determine the next action in a path to performing the task. The prompt includes the screenshot, a list of interactable widgets, and contextual instructions. For example, the prompt may be to determine the next action to obtain the current weather for an input geographic location. The LLM processes this input to infer the next logical action based on the user's goal.

Block 306 includes obtaining a next action attribute set from the LLM. The LLM processes the prompt to generate a next action. The LLM outputs the next action in the form of an attribute set. The attribute set may include details such as the action type (e.g., click, input text), the target element identifier (e.g., CSS selector or XPath), and any associated parameters (e.g., text to enter in a field).

Block 308 includes adding the next action attribute set to an action list. The next action attribute set is appended to the action list. The action list serves as a structured sequence of steps that can be executed or stored for later reuse. For example, the system may maintain the list in JSON format for compatibility with automation frameworks.

Further, in Block 310, the next action is performed. The specified action determined by the LLM on the webpage uses a headless browser. For example, if the action is "click login button," the system uses the provided CSS selector to locate the button and simulate a click event. The state of the action may also be performed and stored in a sequence of states. The result may be a change of state of the source website or a transition to a different website.

In one or more embodiments, the instruction generator performs the requested actions on the website, logging each step (e.g., go to URL, click element, input text) and identifying CSS selectors for the interacted web elements, with a specific focus on extracting a robust selector for the final piece of information as instructed by its prompt.

Block 312 includes determining whether to continue with adding actions to the action list. For example, the determination may be based on predefined termination conditions. The predefined termination conditions may be whether the target data element is extracted, a timeout condition is satisfied, or a number of other action conditions being satisfied. If the determination is made to continue, the process loops back to Block 302 to capture the updated webpage state. If the determination is made not to continue, the process ends.

Figure 4:
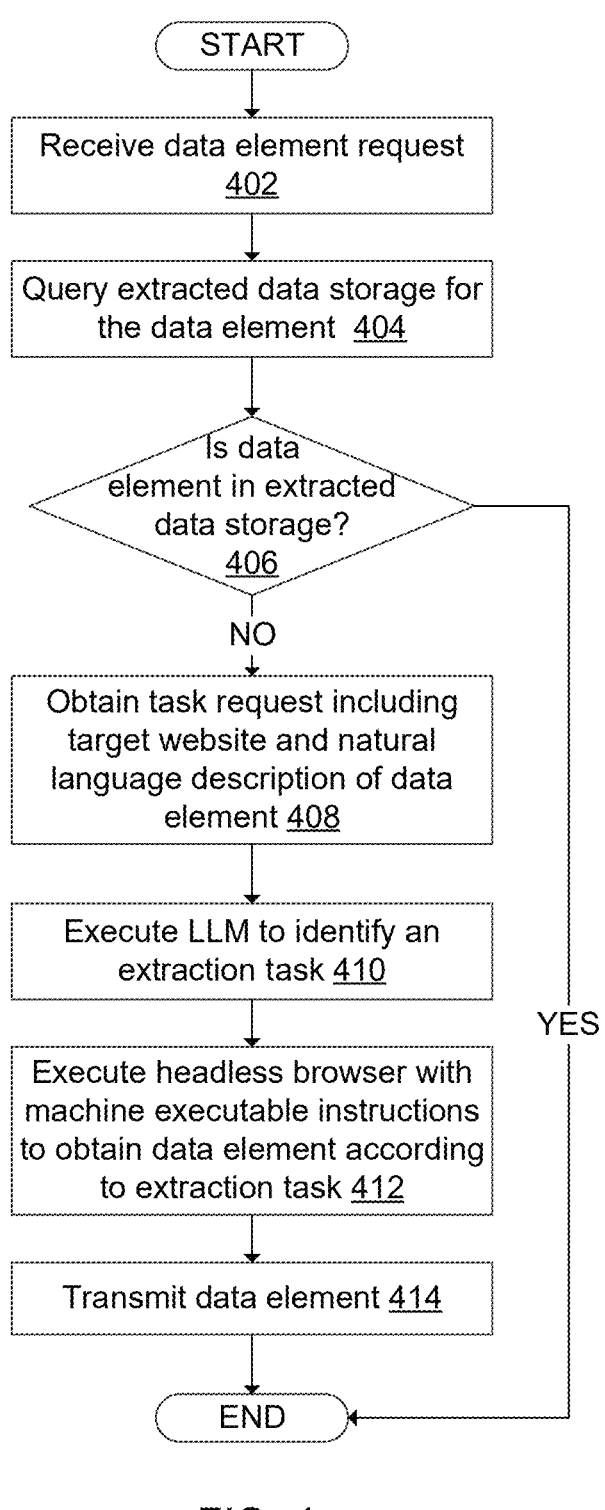
FIG. 4 shows a flowchart for responding to a request for a data element in accordance with one or more embodiments.

FIG. 4 shows a flowchart for extracting a data element at inference stage. Block 402 includes receiving a data element request. The data element request may be performed by receiving a request from a user device or an application specifying a data element to be retrieved. The request may include identifiers such as the type of data element to extract, a starting URL or third-party name from which the data element may be extracted, information for identifying the data element. Further, in some embodiments, the data element request is received as a natural language description.

Block 404 includes querying the extracted data storage for the data element. First a determination is made whether the requested data element is already in the extracted data storage. The extracted data storage may perform operations, such as matching keys, metadata, or semantic embeddings to locate previously extracted data. Thus, in Block 406, a determination is made whether the data element is in the extracted data storage. If the data element is in the extracted data storage, the extracted data element is returned and the flow proceeds to end. If the extracted data element is not in storage, the flow proceeds to Block 408.

Block 408 includes obtaining a task request including a target website and a natural language description of a data element. Obtaining the task request may include performing the following steps. The orchestrator interface may receive the task request, which includes a target website URL and a natural language description of the desired automation (e.g., "Log in and extract the account balance"). The instruction executor within the orchestrator validates the request, assigns a unique task ID, and publishes the task details to a message queue.

Block 410 includes executing an LLM to identify an extraction task. A worker process consumes the task from the queue. The worker may instantiate an AI agent that performs natural language processing on the request. Comparing metadata with the target website URL and the task may be used to identify the set of machine executable instructions to process the request.

Block 412 includes executing the headless browser with machine executable instructions to obtain a data element according to the extraction task. The set of machine executable instructions are performed in order in the headless browser. Input from the task request may be used as a parameter of the machine executable instructions. The headless browser simulates user interactions, such as clicking buttons or entering text, to retrieve the requested data element from the target website. The result of the execution may be the data element.

Block 414 includes transmitting the data element. The retrieved data element may be sent back to the requesting user device or requesting application. The transmission may occur over a secure network connection and may include additional metadata such as timestamp and source URL. Further, the data element may be stored in the extracted data storage.

Figure 5:
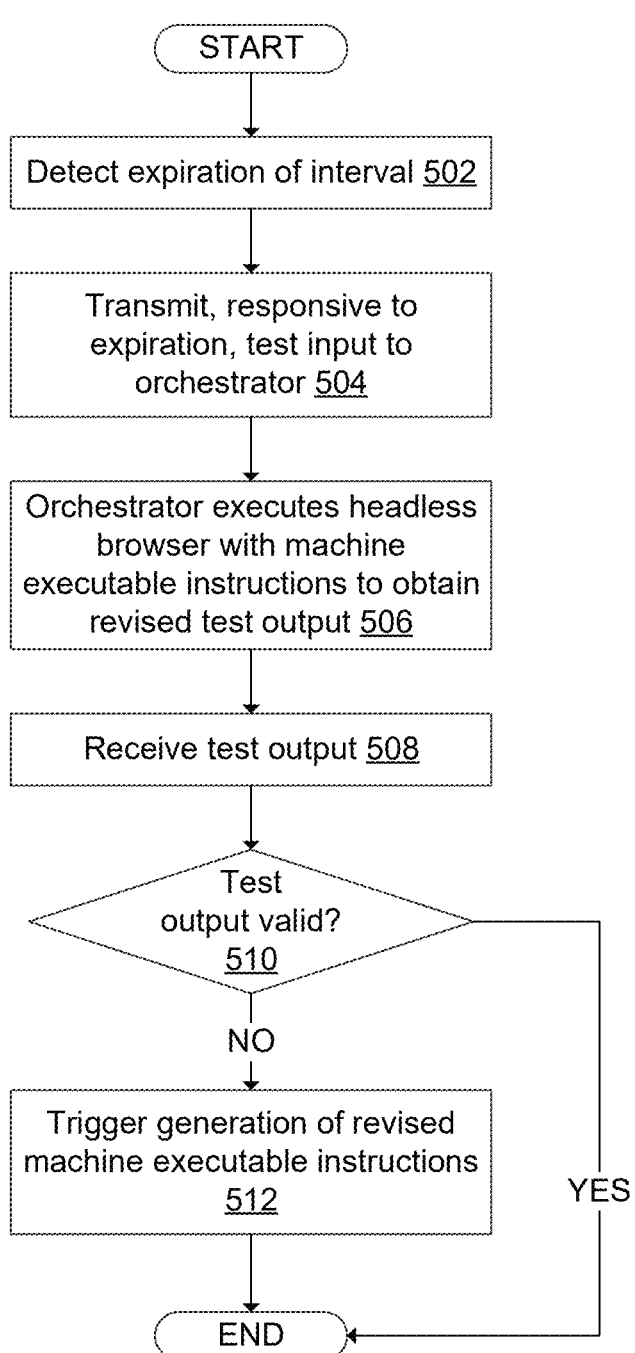
FIG. 5 shows a flowchart for autocorrection of the machine executable instructions in accordance with one or more embodiments.

In some cases, the result of the processing of Block 412 may be an error. For example, third-party websites may change. FIG. 5 shows a flowchart for detecting and correcting a set of machine executable instructions in accordance with one or more embodiments.

Block 502 includes detecting an expiration of interval. The timer or schedule may be monitored to determine when a predefined interval has elapsed. For example, the system may use a cron job or internal scheduler to trigger validation. Validation may also be triggered when the set of machine executable instructions fail to extract data.

Block 504 includes transmitting, responsive to expiration, test input to the orchestrator. This step may be performed by the tester mimicking a task request using the test input in a test case. The task request may be sent similar to Block 408 discussed above. The task request is sent to the orchestrator. The test input simulates a real extraction scenario to verify that the current machine executable instructions still function correctly.

Block 506 includes the orchestrator executing a headless browser with machine executable instructions to obtain a revised test output. Block 412 may be performed similar to Block 506. The orchestrator invokes the headless browser to execute the set of machine executable instructions according to the test case. The headless browser navigates to the target webpage and performs the scripted actions to produce a test output, such as extracting a specific data element.

Block 508 includes receiving a test output. The test output is returned to the tester.

Block 510 includes determining whether the test output is valid. The tester compares the test output with the actual output in the test case to determine whether the test output is valid. Further, the received test output may be compared against validation criteria. For example, the system may check whether the extracted data matches a known value or conforms to a specific format. If valid, the process ends. If invalid, the process proceeds to Block 512.

Namely, the processing of Blocks 506-510 includes periodically testing the set of machine executable instructions. When the set of machine executable instructions' testing results in failure, the set of machine executable instructions are regenerated.

Block 512 includes triggering generation of the set of revised machine executable instructions. A regeneration process is instantiated using the builder. In the generating, with the LLM, a revised action list for performing the extraction task is generated. Generating the revised action list is similar to generating the original action list in FIG. 3 but using the machine executable instructions as a guide. Specifically, the current webpage data of a current webpage is captured. The LLM is prompted with the current webpage data and a current next action attribute set in the action list or in the current version of the machine executable instructions to generate a revised next action attribute set for a revised next action to perform the extraction task. The revised next action attribute set may be compared to the current next action attribute set. The current next action attribute set in the revised action list is replaced with the revised next action attribute set when the revised next action deviates from the current next action. Further, the revised next action according to the next action attribute set is performed. In some cases, the LLM may include, in the prompt, the machine executable instructions to determine whether the instruction is still valid or invalid based on the current webpage data. Thus, the LLM may regenerate only if the LLM determines that the current instruction is invalid.

As shown by FIGS. 1-5, one aspect of embodiments relates to natural language task interpretation and autonomous script generation. One or more embodiments translates a flexible, high-level natural language task description, such as "log in and find X," into a complete, executable script. This is achieved by an AI agent that autonomously plans and executes the web interactions. This approach differs from conventional solutions that rely heavily on user recordings or structured visual programming.

Another aspect involves integrated self-healing through AI-driven script regeneration. One or more embodiments offer more comprehensive solutions for self-healing. When a failure occurs, the system feeds the failure context, including error messages and failing selectors, back to the same AI agent that initially processed the natural language task. The AI agent then reevaluates the original goal against the current state of the website and regenerates a new script. This regenerated script may include different logic or steps rather than simply patching a selector. This deeper level of reasoning and full script regeneration based on failure context represents a significant advancement over traditional locator-based self-healing.

A further aspect of the invention is the holistic AI-driven workflow for both creation and maintenance of automation scripts. The tight integration of AI-driven natural language understanding for initial script creation with AI-driven remediation and regeneration for maintenance, all within a consistent AI agent framework, provides a more unified and automated solution compared to systems that employ separate, less integrated mechanisms for design and repair.

Figure 6A:
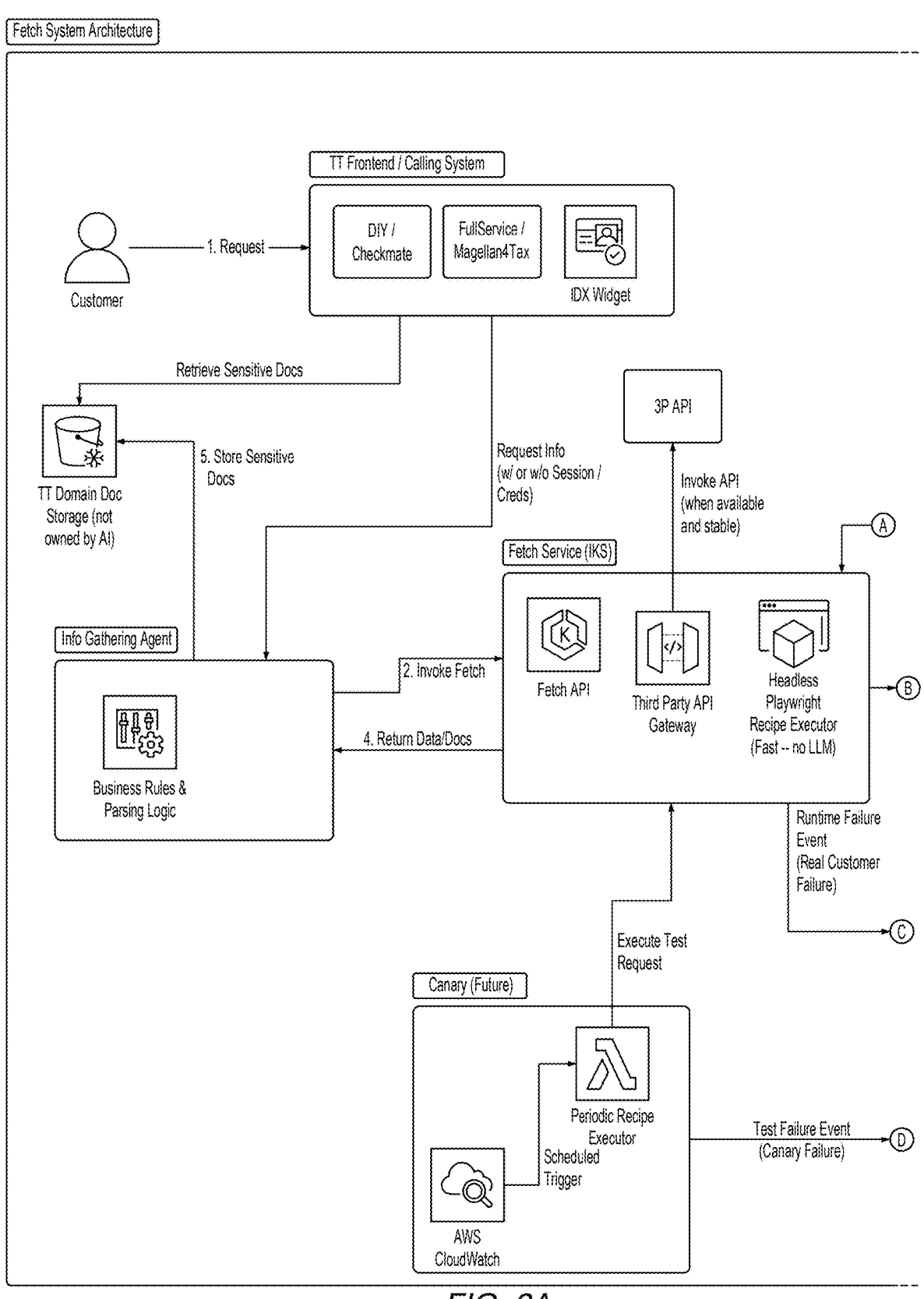
Figure 6B:
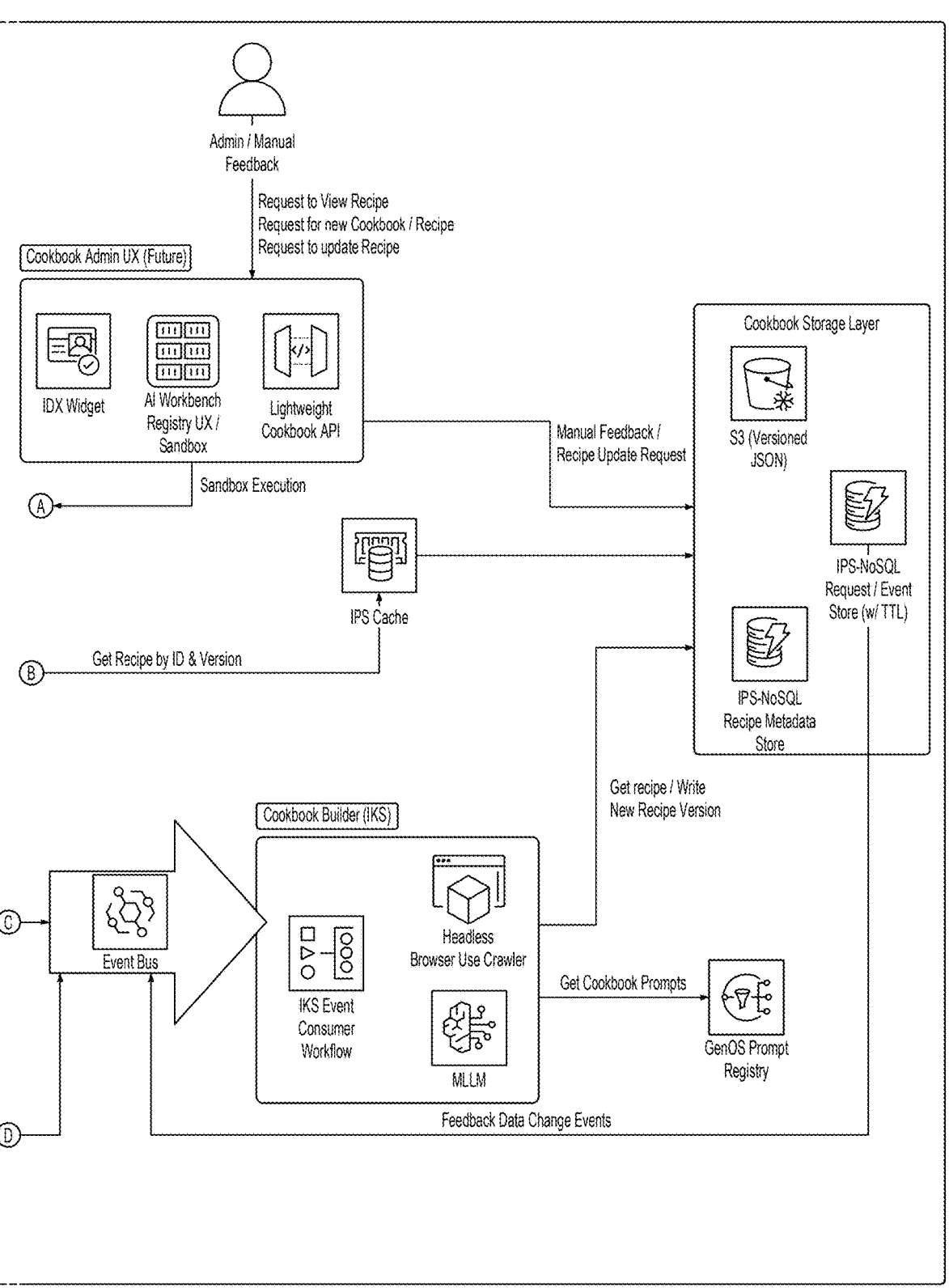

FIG. 6A and FIG. 6B show an example architecture diagram in accordance with one or more embodiments. FIGS. 6C and 6D show an example JSON file. Specifically, FIG. 6A, FIG. 6B, FIG. 6C, and FIG. 6D show an example implementation. The following example is for explanatory purposes only and not intended to limit the scope of one or more embodiments.

The architecture of FIG. 6A and FIG. 6B is a generative AI-powered platform designed to navigate third-party websites and APIs. The architecture is inherently scalable and robust due to a clear separation of responsibilities between its components, creating an offline compilation phase and a live execution phase. The computationally expensive and non-deterministic task of using an MLLM to navigate websites is delegated entirely to the cookbook builder (602). The cookbook builder (602) may operate offline, without impacting customer experience, to generate, test, and optimize data collection patterns referred to as "Recipes."

The live, latency-sensitive cookbook executor, referred to as the fetch service (604), is responsible for executing the pregenerated and validated recipes. The fetch service (604) ensures that every customer interaction uses the same reliable instructions, guaranteeing consistency while reducing cost and latency. By decoupling execution from real-time LLM processing, the system eliminates dependencies on LLM availability, performance variability, or inconsistency during critical customer interactions.

The separation between the cookbook builder and the fetch allows for computing system efficiency. The cookbook builder (602) functions as the intelligent browser, responsible for planning and generating recipes. The fetch service (604) acts as a lightweight runtime executor that performs web actions without understanding their semantic meaning. The information gathering agent (606) serves as the business logic layer, interpreting the context of the extracted data, such as determining whether an item is tax-deductible, and formatting the data for the consuming client or portal.

For example, embodiments may be used to handle a property tax use case; however, the architecture is designed to be generic and extensible, supporting a wide range of additional applications.

The system includes an information gathering agent that functions as an abstraction layer for integrating the platform's capabilities into various client-facing applications, such as full-service or do-it-yourself tax preparation experiences. The information gathering agent is client-agnostic and operates as a background process for supported use cases. For example, in a property tax scenario, the info gathering agent receives input such as a user's address, zip code, and tax year, and uses this information to retrieve property tax data. Data retrieval may occur automatically through an application programming interface (API) or by executing a headless browser session. When available, documents are returned in portable document format (PDF); otherwise, the system captures a screenshot of the relevant webpage. The resulting file is stored for review by a full-service expert, enabling accurate calculation of deductible property tax while eliminating the need for manual navigation of third-party property tax websites by the expert or the customer.

The platform supports fully automated background processes for simple, public data retrieval tasks. For use cases requiring user authentication, such as retrieving financial account statements, the system is designed to orchestrate a headless browser experience using a secure identity exchange (IDX) widget embedded within the product interface to manage user credentials.

The fetch service operates as a runtime execution component responsible for executing pregenerated recipes. The fetch service does not rely on generative AI and may be implemented using a custom browser, which incorporates anti-fingerprinting techniques to emulate normal web traffic. The fetch service is built on a browser automation framework that supports advanced features such as auto-wait and web-first assertions. Auto-wait eliminates the need for static timeouts by waiting for elements to become actionable, while web-first assertions provide robust handling of dynamic web content. The fetch service is implemented on the python paved road (PSK) and uses FastAPI as the web framework, enabling automatic updates for security and performance. When available, the fetch service uses third-party APIs for data retrieval; otherwise, it launches a headless browser to execute a recipe containing navigation and interaction steps required to obtain the requested data.

The platform organizes data into cookbooks and recipes, with raw recipe files and associated metadata stored separately. Cookbook and recipe storage is performed in JSON in some embodiments. The raw JSON recipe files are stored in S3 using a hierarchical folder structure that enables clear organization and versioning: /<cookbook_name>/<recipe_id>/v<version_number>.json.

For example, version 1 of the Alameda County recipe within the property tax cookbook would be located at: property_tax/alameda_ca/v1.json. A single cookbook can contain hundreds of recipes; the property tax cookbook, for instance, will have approximately 350 recipes, one for each supported county.

Recipes may be just static JSON files, so a very cheap and scalable way for storage may be used, allowing recipe serving and structured metadata to scale independently.

The recipe metadata database acts as the metadata index. It tracks the status and lifecycle of each recipe version, maintaining pointers to which version is latest_active for production traffic, which is pending validation, and which may be deprecated. This allows for dynamic routing and safe deployment of new recipe versions.

The recipe metadata, events, and logs are relational in nature, e.g. by recipe ID, so storing them can make the most sense schema wise. Metadata associated with a recipe should not be changing too often. The storage allows for easier query of data for eventual analytics/admin pages like getting recipes by status, runs per recipe, etc.

The system includes a scheduled, automated testing service referred to as the canary (610), which is configured to provide proactive quality assurance across all cookbooks. The canary (610) is designed to detect broken recipes before a customer encounters an issue, particularly for use cases that are invoked infrequently. The canary operates on a schedule triggered by AWS® CloudWatch® Service and invokes the fetch service (604) to execute a recipe using test data. If the canary execution fails, a test failure event is transmitted to an event bus, which triggers the cookbook builder to initiate remediation.

The system further incorporates multiple feedback and remediation loops to maintain recipe accuracy. All feedback mechanisms converge on the event bus, which serves as a central routing point for tasks directed to the cookbook builder (602). Event sources include runtime failures, where the info gathering agent detects an error and transmits a runtime failure event; expert feedback failures, where a tax expert identifies an incorrect form or extraction error, resulting in an expert feedback failure event; canary failures, which generate a test failure event; and manual feedback or creation requests submitted by an administrator through a lightweight cookbook application programming interface (API), which generates an event. Event metadata is temporarily stored with a time-to-live (TTL) parameter to ensure timely invalidation and removal of stale data.

FIG. 6C shows an example of a recipe metadata (680). FIG. 6D shows an example of a recipe (690), with the various actions in a sequence.

Figure 7:
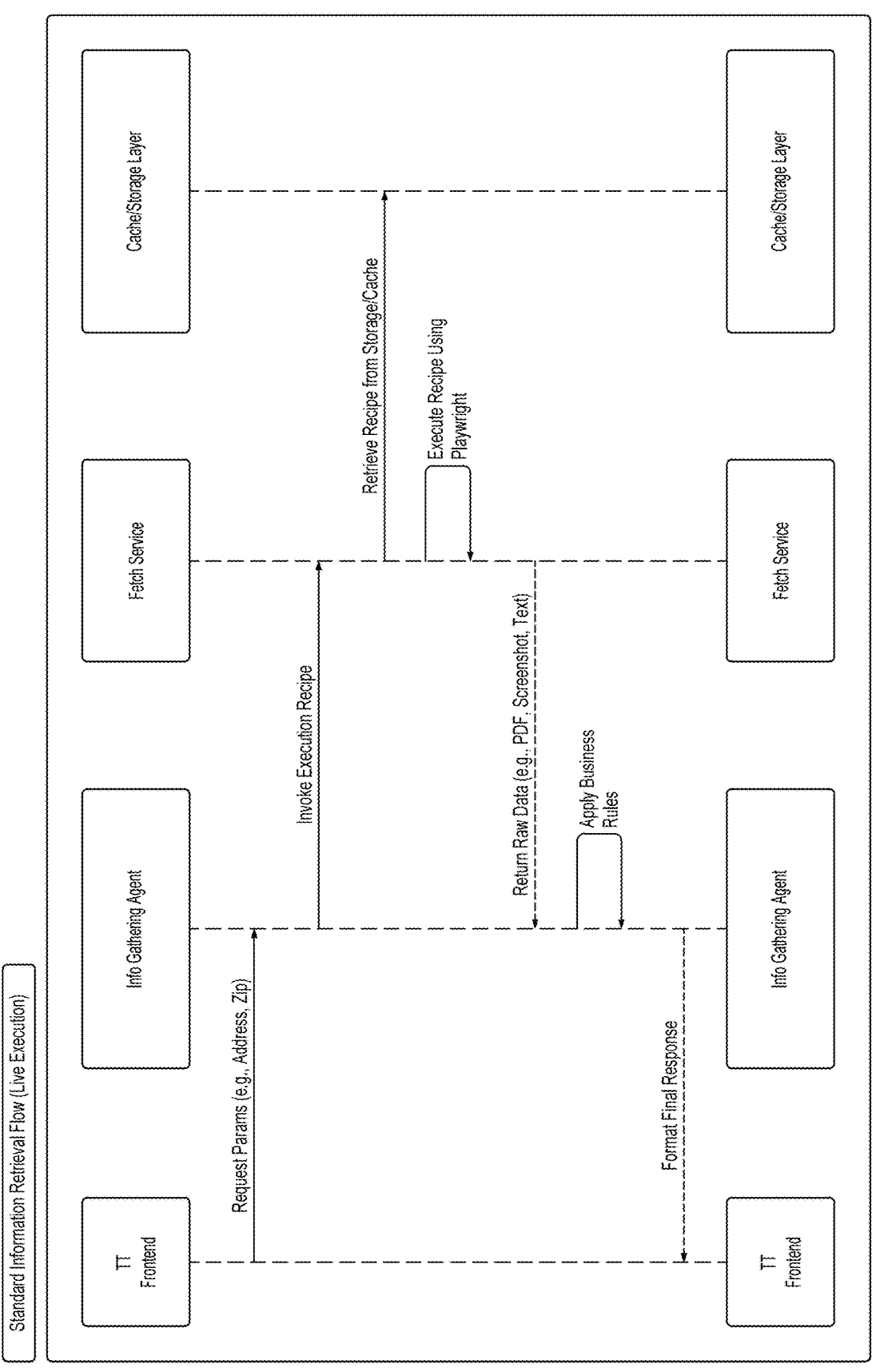
FIG. 7 shows an example timing diagram for obtaining a data element in accordance with one or more embodiments.

FIG. 7 shows an example timing diagram (700) for obtaining a data element in accordance with one or more embodiments. The process begins when the TurboTax (TT) frontend transmits request parameters, such as an address, zip code, and tax year, to the info gathering agent. The info gathering agent invokes an execution recipe by sending a request to the fetch service. The fetch service retrieves the corresponding recipe from the cache or storage layer and then executes the recipe using Playwright to perform necessary web interactions.

Upon completion of recipe execution, the fetch service returns raw data, which may include a PDF document, a screenshot, or extracted text, to the info gathering agent. The info gathering agent applies business rules to interpret and format the retrieved data. Finally, the formatted response is transmitted back to the TT frontend for presentation to the user.

This sequence ensures that the latency-sensitive execution phase relies on pregenerated recipes, while the info gathering agent manages orchestration and business logic, and the fetch service performs deterministic execution steps using a headless browser framework.

Figure 8:
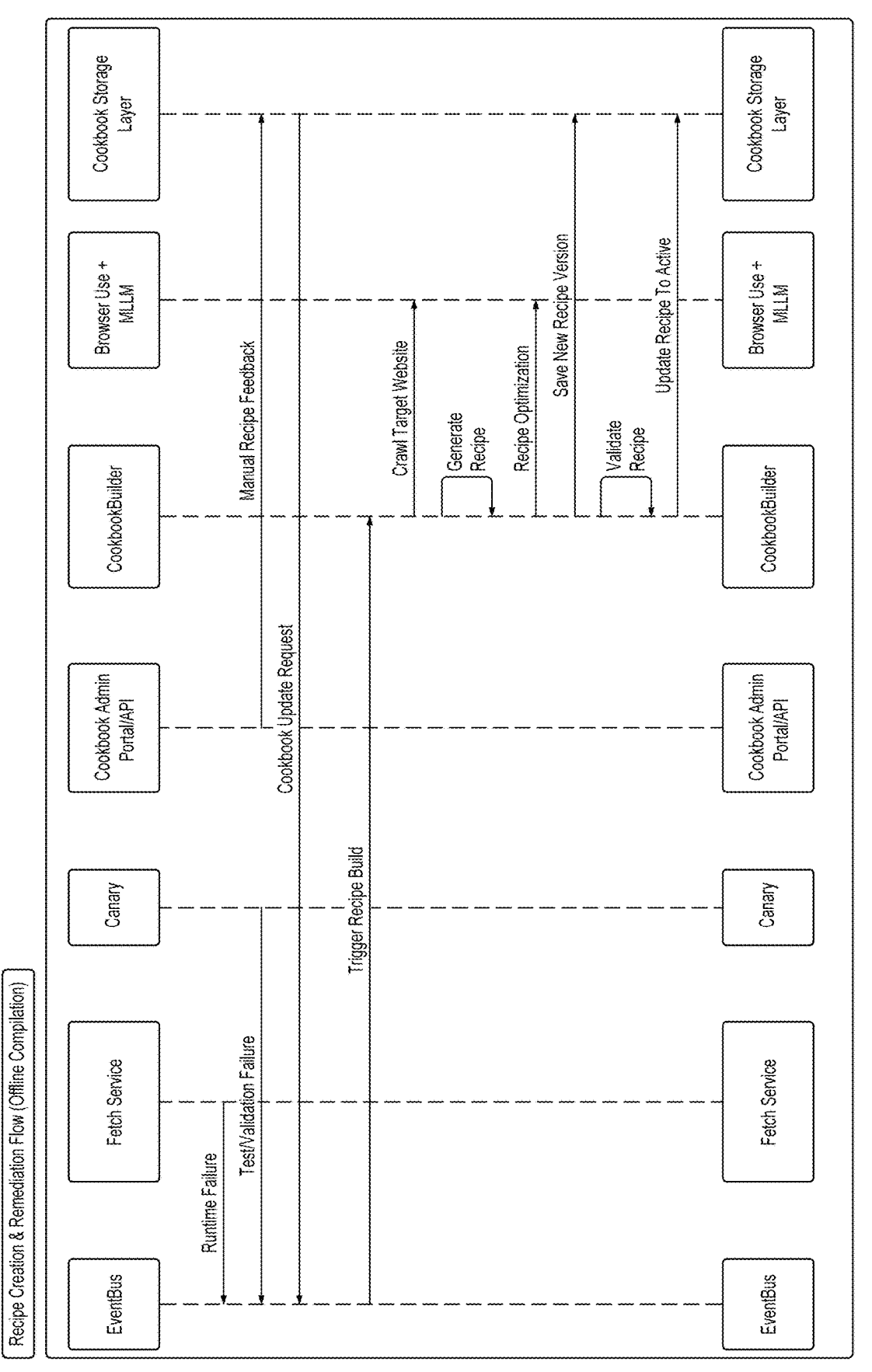
FIG. 8 shows an example timing diagram for generating and correcting machine executable instructions.

FIG. 8 shows an example timing diagram (800) for generating and correcting machine executable instructions. The process begins when an event bus detects a failure condition, such as a runtime failure or a test validation failure, and transmits a corresponding event. The event triggers a recipe build request, which is routed through the cookbook admin portal or API to the cookbook builder.

The cookbook builder initiates a series of operations to generate or update a recipe. These operations include crawling the target website, generating a recipe based on the site structure and task requirements, and performing recipe optimization to improve efficiency and reliability. Once the recipe is generated, the system saves a new recipe version to the cookbook storage layer. The recipe is then validated to ensure correctness and compliance with predefined criteria. Upon successful validation, the recipe status is updated to active, making the recipe available for execution by the fetch service during live operations.

The timing diagram further illustrates that manual recipe feedback can be provided through the cookbook admin portal or API, enabling human-in-the-loop adjustments. Additionally, the process may involve the use of an MLLM during the crawling and recipe generation stages to interpret complex page structures and generate robust automation steps. The storage layer maintains versioned recipes and associated metadata to support rollback, auditing, and controlled deployment of updates.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 9A:
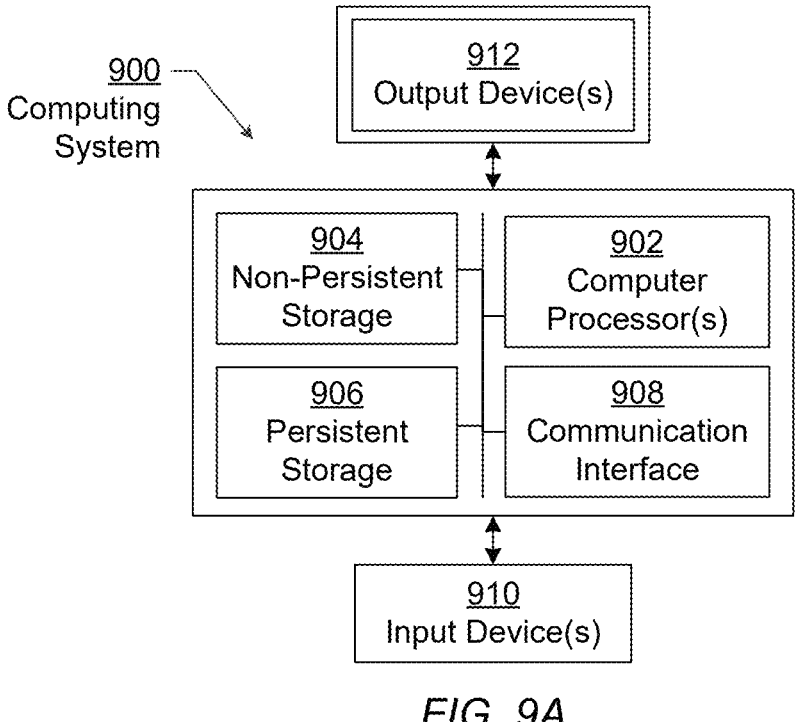
FIG. 9A and FIG. 9B show a computing system in accordance with one or more embodiments.

For example, as shown in FIG. 9A, the computing system (900) may include one or more computer processor(s) (902), non-persistent storage device(s) (904), persistent storage device(s) (906), a communication interface (908) (e.g., Bluetooth interface, infrared interface, network interface, optical interface, etc.), and numerous other elements and functionalities that implement the features and elements of the disclosure. The computer processor(s) (902) may be an integrated circuit for processing instructions. The computer processor(s) (902) may be one or more cores, or micro-cores, of a processor. The computer processor(s) (902) includes one or more processors. The computer processor(s) (902) may include a central processing unit (CPU), a graphics processing unit (GPU), a tensor processing unit (TPU), combinations thereof, etc.

The input device(s) (910) may include a touchscreen, keyboard, mouse, microphone, touchpad, electronic pen, or any other type of input device. The input device(s) (910) may receive inputs from a user that are responsive to data and messages presented by the output device(s) (912). The inputs may include text input, audio input, video input, etc., which may be processed and transmitted by the computing system (900) in accordance with one or more embodiments. The communication interface (908) may include an integrated circuit for connecting the computing system (900) to a network (not shown) (e.g., a local area network (LAN), a wide area network (WAN) such as the Internet, mobile network, or any other type of network) or to another device, such as another computing device, and combinations thereof.

Further, the output device(s) (912) may include a display device, a printer, external storage, or any other output device. One or more of the output device(s) (912) may be the same or different from the input device(s) (910). The input device(s) (910) and output device(s) (912) may be locally or remotely connected to the computer processor(s) (902). Many different types of computing systems exist, and the aforementioned input device(s) (910) and output device(s) (912) may take other forms. The output device(s) (912) may display data and messages that are transmitted and received by the computing system (900). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (902), is configured to perform one or more embodiments, which may include transmitting, receiving, presenting, and displaying data and messages described in the other figures of the disclosure.

Figure 9B:
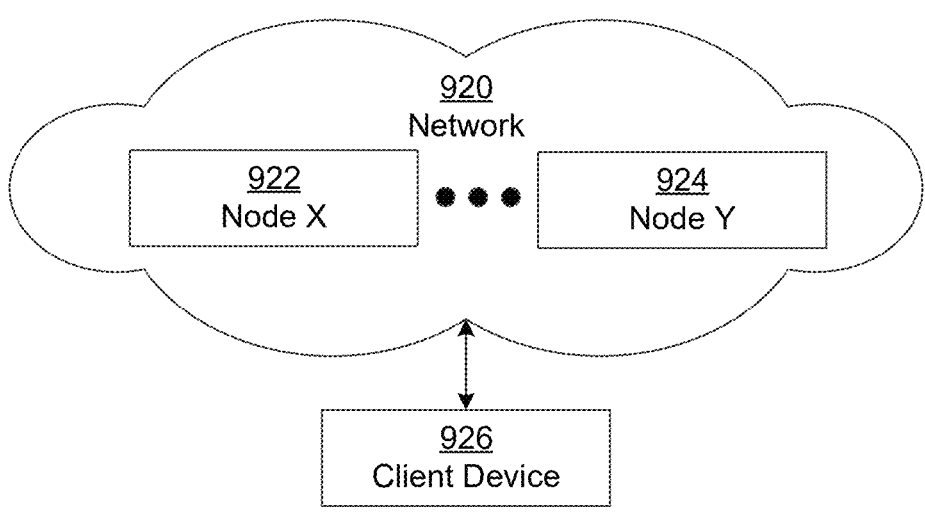

The computing system (900) in FIG. 9A may be connected to, or be a part of, a network. For example, as shown in FIG. 9B, the network (920) may include multiple nodes (e.g., node X (922) and node Y (924), as well as extant intervening nodes between node X (922) and node Y (924)). Each node may correspond to a computing system, such as the computing system shown in FIG. 9A, or a group of nodes combined may correspond to the computing system shown in FIG. 9A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (900) may be located at a remote location and connected to the other elements over a network.

The nodes (e.g., node X (922) and node Y (924)) in the network (920) may be configured to provide services for a client device (926). The services may include receiving requests and transmitting responses to the client device (926). For example, the nodes may be part of a cloud computing system. The client device (926) may be a computing system, such as the computing system shown in FIG. 9A. Further, the client device (926) may include or perform all or a portion of one or more embodiments.

The computing system of FIG. 9A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
   generating, with a large language model (LLM), an action list for performing an extraction task from at least one website, wherein generating the action list comprises for each of a plurality of actions in the action list:
     capturing current webpage data comprising a screenshot of a current webpage and a set of interactable widgets on the current webpage,
     obtaining, using an LLM processing the current webpage data, a next action attribute set for a next action to perform extraction task, the next action being in the plurality of actions,
     adding the next action attribute set to the action list,
     performing the next action according to the next action attribute set;
   traversing the action list to filter out at least one superfluous action;
   generating, after filtering, a set of machine executable instructions from the action list;

storing the set of machine executable instructions associated with a task identifier of the extraction task; and executing the set of machine executable instructions to extract a data element from the at least one website.

2. The method of claim 1, further comprising:

receiving a request to perform the extraction task;

retrieving the set of machine executable instructions using the task identifier of the extraction task; and responding to the request with the data element.

3. The method of claim 2, further comprising:

while traversing the action list, identifying a sequence of states when performing the plurality of actions, wherein filtering out at least one superfluous actions comprises determining a subsequence of the sequence of states that are unchanged, wherein the at least one superfluous action corresponds to the subsequence.

4. The method of claim 1, further comprising:

executing a headless browser with the machine executable instructions to obtain the data element according to the extraction task.

5. The method of claim 1, further comprising:

periodically testing the set of machine executable instructions; and regenerating the set of machine executable instructions when testing results in failure.

6. The method of claim 1, wherein periodically testing comprises:

transmitting, responsive to an expiration of a time limit, a test input to an orchestrator;

executing the set of machine executable instructions using the test input to generate a test output; and determining whether failure of the test occurs according to the test output.

7. The method of claim 6, wherein executing the set of machine executable instructions comprises:

generating, with the LLM, a revised action list for performing the extraction task, wherein generating the revised action list comprises:

capturing the current webpage data of a current webpage, prompting the LLM, with the current webpage data and a current next action attribute set of a current next action in the action list, to generate a revised next action attribute set for a revised next action to perform the extraction task, comparing the revised next action attribute set to the current next action attribute set, updating the current next action attribute set in the revised action list when the revised next action deviates from the current next action, and performing the revised next action according to the next action attribute set.

8. The method of claim 6, further comprising:

executing, by the orchestrator, a headless browser with a set of machine executable instructions and the test input as input to obtain the test output from the test input.

9. The method of claim 1, wherein the set of machine executable instructions comprises at least one of a data file listing a series of steps and code defining the series of steps.

10. A system comprising:

one or more computer processors;

a builder executing on the one or more computer processors and configured for:

generating, with a large language model (LLM), an action list for performing an extraction task from at least one website, wherein generating the action list comprises for each of a plurality of actions in the action list:

capturing current webpage data comprising a screenshot of a current webpage and a set of interactable widgets on the current webpage, obtaining, using an LLM processing the current webpage data, a next action attribute set for a next action to perform extraction task, the next action in the plurality of actions, adding the next action attribute set to the action list, performing the next action according to the next action attribute set, and generating a set of machine executable instructions from the action list;

an extraction data storage storing the set of machine executable instructions associated with a task identifier of the extraction task; and an orchestrator executing on one or more computer processors and configured for:

receiving a request to perform the extraction task, retrieving the set of machine executable instructions using the task identifier of the extraction task, executing the set of machine executable instructions to extract a data element from the at least one website, and responding to the request with the data element.

11. The system of claim 10, wherein the builder comprises an instruction generator configured for:

traversing the action list to filter out at least one superfluous action prior to generating the machine executable instructions from the action list.

12. The system of claim 11, wherein the builder comprises the instruction generator configured for:

while traversing the action list, identifying a sequence of states when performing the plurality of actions, wherein filtering out at least one superfluous actions comprises determining a subsequence of the sequence of states that are unchanged, wherein the at least one superfluous action corresponds to the subsequence.

13. The system of claim 10, further comprising:

a headless browser executing the machine executable instructions to obtain the data element according to the extraction task.

14. The system of claim 10, further comprising:

a tester executing on the one or more computer processors for:

periodically testing the set of machine executable instructions, and regenerating the set of machine executable instructions when testing results in failure.

15. The system of claim 10, wherein periodically testing comprises:

transmitting, responsive to an expiration of a time limit, a test input to an orchestrator;

executing the set of machine executable instructions using the test input to generate a test output; and determining whether failure of the test occurs according to the test output.

16. The system of claim 15, wherein executing the set of machine executable instructions comprises:

generating, with the LLM, a revised action list for performing the extraction task, wherein generating the revised action list comprises:

capturing the current webpage data of a current webpage, prompting the LLM, with the current webpage data and a current next action attribute set of a current next action in the action list, to generate a revised next action attribute set for a revised next action to perform the extraction task, comparing the revised next action attribute set to the current next action attribute set, updating the current next action attribute set in the revised action list when the revised next action deviates from the current next action, performing the revised next action according to the next action attribute set.

17. The system of claim 15, wherein the orchestrator is further for:

executing a headless browser with a set of machine executable instructions and the test input as input to obtain the test output from the test input.

18. A method comprising:

periodically testing a set of machine executable instructions to extract a data element from at least one webpage; and regenerating the set of machine executable instructions when testing results in failure, wherein regenerating the set of machine executable instructions comprises:

generating, with a large language model (LLM), a revised action list for performing an extraction task, wherein generating the revised action list comprises:

capturing current webpage data of a current webpage, prompting the LLM, with the current webpage data and a current next action attribute set of a current next action in an action list, to generate a revised next action attribute set for a revised next action to perform the extraction task, comparing the revised next action attribute set to the current next action attribute set, updating the current next action attribute set in the revised action list when the revised next action deviates from the current next action, and performing the revised next action according to the revised next action attribute set.

19. The method of claim 18, wherein periodically testing comprises:

transmitting, responsive to an expiration of a time limit, a test input to an orchestrator;

executing the set of machine executable instructions using the test input to generate a test output; and determining whether failure of the test occurs according to the test output.

20. The method of claim 18, further comprising:

executing a headless browser with a set of machine executable instructions and a test input as input to obtain a test output from the test input.

*   *   *   *   *